3,036,014
RED EMITTING ELECTROLUMINESCENT ALUMINUM NITRIDE
Irving Adams, Cranford, N.J., and Guenther A. Wolff, Lyndhurst, Ohio, assignors to the United States of America as represented by the Secretary of the Army
No Drawing. Filed Sept. 20, 1961, Ser. No. 140,176
(Granted under Title 35, U.S. Code (1952), sec. 266)
3 Claims. (Cl. 252—301.4)

The invention described herein may be manufactured and used by or for the Government for governmental purposes without the payment of any royalty thereon.

This invention relates to a method of making red electroluminescent aluminum nitride of greatly increased brightness.

Electroluminescence, that is, the production of sustained luminescence in a previously unexcited phosphor by application of an electric field has been observed in BN, GaP, Ga (P, As) and (Ga, In) P. Other compounds composed of elements from the groups IIIb and Vb of the periodic table show similar effects but as far as AlN is concerned its electroluminescence in the visible range has been found to be very weak. In fact, pure crystals of AlN obtained by sublimation are found to be neither fluorescent nor phosphorescent nor electroluminescent.

In our previous application (Serial No. 793,646, filed February 16, 1959, now U.S. Patent No. 2,997,446), we have disclosed a four-step method of making aluminum nitride of strong electroluminescent properties. The first step consists in the formation of an ultra-pure aluminum nitride by heating aluminum powder of 99.99% purity in dry nitrogen gas under high pressure and temperature. The resulting crystalline aluminum nitride in powdered form is then purified in the second step by passing a dry halogen gas over it at temperatures of about 300 to 1500° C. In the third step purified aluminum nitride is doped with a doping agent selected from the group consisting of magnesium, manganese, beryllium, zinc, cadmium, copper, silver, carbon, silicon, germanium, tin, lead, iron, cobalt, nickel, sulfur and their respective chemical compounds in an amount slightly in excess of the amount which is necessary to impart to said aluminum nitride electroluminescent properties and the fourth step consists in heating the doped aluminum nitride in the presence of halogen gas to the same temperature as in the first step for a period of time necessary and sufficient to drive off the excess of doping agent. This excess is easily removed since that particular part of the doping agent or activator which causes the electroluminescence is much stronger bound to the aluminum nitride crystal than the excess part that does not cause electroluminescent activation.

There is a need for electroluminescent substances which shows very bright red luminescence. Some of the doping agents mentioned above, particularly manganese, yield a red luminescence but this doping agent yields only one specific peak emission at about 6200 angstrom.

We now have found that by doping aluminum nitride in the above-described manner with rare earth elements particularly europium or semarium it is possible to obtain an electroluminescent aluminum nitride having peak emissions at various wavelengths in the red and infrared from about 6000 to 7000 angstrom.

The invention will become more apparent from the following specific examples:

*Example 1*

An ultra-pure crystalline aluminum nitride is first prepared by placing 1 gram of pure powdered aluminum (99.99% purity or better) in a thimble or crucible about 2 inches high and one-half inch wide made of a refractory material as for instance alundum or aluminum nitride itself. This crucible is placed inside a tungsten coil and supported by a tantalum plate. This assembly is placed in a stainless steel bomb, 12 inches high and 3 inches wide with one-half inch walls. Dry nitrogen of highest purity from a nitrogen cylinder is passed into the bomb until a pressure of about 270 to 300 p.s.i. is attained. The tungsten heating element is heated by passing 100 amperes of current through it. The bomb is maintained at about 2000° C. for ten minutes, then allowed to cool after which the bomb is opened and disassembled.

The resulting crystalline AlN powder is now purified by passing a halogen gas over it at temperatures of about 800° C. The gas can be $Cl_2$, $Br_2$ or $I_2$. The purified AlN as it comes out of the bomb is ground to about 50 mesh or smaller and is placed in an alundum boat which in turn is placed in a quartz tube. A drying agent, for instance, phosphorous pentoxide is placed in the tube so that the gas must pass through or over it to reach the powdered aluminum nitride sample which is heated to about 800° C. The gas is passed over and heated nitride powder for about 5 minutes which is then allowed to cool.

One gram of the powdered, ultra-pure aluminum nitride is mixed with 0.5% europium in the form of the europium oxide ($Eu_2O_3$). This mixture is now placed in the alundum boat and heated in an inert atmosphere preferably nitrogen for about 15 minutes at temperatures of about 800° C. To remove the excess of europium, the tube is then flushed with chlorine gas and heated for 10–20 minutes at about 800° C., then flushed again with the inert gas. The resultant phosphor has a very bright red electroluminescence.

*Example 2*

One gram of the powdered, ultra-pure aluminum nitride manufactured as described above is intimately mixed with 0.1 gram of samarium as oxide or chloride. The powdered mixture is then placed in an alundum boat and heated to 800° C. for 15 minutes in pure nitrogen gas. The tube is then flushed with chlorine gas and fired again for 10–20 minutes at 800° C. and then flushed again with nitrogen. The resulting phosphor shows very bright red electroluminescence.

The electroluminescent aluminum nitride made according to this invention shows all the advantages described in our above-mentioned copending application but shows in addition thereto an extremely bright red electroluminescence which makes it possible to use the material to great advantage either alone or in mixture with other electroluminescent materials in such applications as electroluminescent lamps, display panels for radar, light amplification devices, instrument panels, etc.

What is claimed is:

1. A method of producing a bright red electroluminescent aluminum nitride comprising preparing crystalline aluminum nitride by reacting powdered aluminum of preferably at least 99.99% purity with dry nitrogen under high pressure and temperature, purifying the resulting crystalline aluminum nitride in powdered form by passing a dry halogen gas over it at temperatures of about 300 to 1500° C., doping the purified crystalline aluminum nitride with a doping agent selected from the group consisting of europium and samarium in amounts slightly in excess of the amount which is capable of imparting to said aluminum nitride electroluminescent properties and again heating the doped aluminum nitride in the presence of a halogen gas to temperatures of between about 300 to 1500° C. to remove the excess doping agent.

2. A method of producing a bright red electroluminescent aluminum nitride according to claim 1 in which europium is used as the doping agent.

3. A method of producing a bright red electroluminescent aluminum nitride according to claim 1 in which samarium is used as the doping agent.

References Cited in the file of this patent
UNITED STATES PATENTS 2,997,446    Adams et al. _____ Aug. 22, 1961

FOREIGN PATENTS 970,869    Germany _____ Nov. 6, 1958

OTHER REFERENCES

Kroger: Some Aspects of the Luminescence of Solids, Elsevier Pub. Co., N.Y. (1948), pages 270, 278, 291, 292, 294, 295, and 296.